United States Patent
Chen et al.

(10) Patent No.: US 9,431,869 B2
(45) Date of Patent: Aug. 30, 2016

(54) HYDRAULIC ENERGY CONVERSION DEVICE

(71) Applicant: NATIONAL CHUNG SHAN INSTITUTE OF SCIENCE AND TECHNOLOGY, Longtan Township (TW)

(72) Inventors: Chuen-An Chen, Longtan Township (TW); Che-Pin Chen, New Taipei (TW); Chieh Tung, Zhongli (TW); Te-Ming Yeh, Pingzhen (TW); Min-Hua Shih, Longtan Township (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 52 days.

(21) Appl. No.: 14/542,718

(22) Filed: Nov. 17, 2014

(65) Prior Publication Data

US 2015/0136550 A1    May 21, 2015

(30) Foreign Application Priority Data

Nov. 19, 2013 (TW) .............................. 102141970 A

(51) Int. Cl.
| | |
|---|---|
| *B60G 13/14* | (2006.01) |
| *H02K 7/00* | (2006.01) |
| *F16F 9/32* | (2006.01) |
| *F03B 13/00* | (2006.01) |
| *F16F 9/10* | (2006.01) |

(52) U.S. Cl.
CPC ............... *H02K 7/003* (2013.01); *F03B 13/00* (2013.01); *F16F 9/10* (2013.01); *F16F 9/32* (2013.01); *F05B 2220/60* (2013.01); *Y02B 10/50* (2013.01)

(58) Field of Classification Search
CPC ............ H02K 7/003; F16F 9/32; F16F 9/10; F03B 13/00; Y02B 10/50; F05B 2220/60; B60G 13/14; F01C 21/0827; F01C 21/0845; F04C 2/348
USPC ......... 188/316, 297; 418/266–268, 259, 265, 418/133, 15; 180/165
See application file for complete search history.

(56) References Cited

U.S. PATENT DOCUMENTS

| | | | | |
|---|---|---|---|---|
| 2,357,333 | A | * | 9/1944 | Kendrick et al. ....... F01C 1/344 418/267 |
| 2,632,398 | A | * | 3/1953 | Ferris .................. F01C 21/0845 267/160 |

(Continued)

*Primary Examiner* — Thomas J Williams
*Assistant Examiner* — Mariano Sy
(74) *Attorney, Agent, or Firm* — Schmeiser, Olsen & Watts, LLP

(57) ABSTRACT

A hydraulic energy conversion device includes a main body being an annular member having a central hole, an output shaft mounted in the central hole of the main body with a centerline extended perpendicular to the central hole; a fixing plate located at an end of the main body and provided with a plurality of passage holes; an outer cover located at another end of the main body opposite to the fixing plate and having a central opening for the output shaft to outwardly extended through the outer cover; and a plurality of vanes circumferentially spaced on the output shaft to locate in a space defined between the main body, the fixing plate and the outer cover. The hydraulic energy conversion device is mounted in a hydraulic shock absorber to convert hydraulic energy into mechanical energy and output the same without hindering the hydraulic shock absorber from normal operation.

5 Claims, 2 Drawing Sheets

(56) References Cited

U.S. PATENT DOCUMENTS

| | | | | |
|---|---|---|---|---|
| 3,717,423 A * | 2/1973 | Pedersen | F04C 14/10 | |
| | | | 418/150 | |
| 3,761,206 A * | 9/1973 | Fierstine | F04C 14/10 | |
| | | | 192/45.002 | |
| 3,981,648 A * | 9/1976 | Jordan | F01C 21/0863 | |
| | | | 418/267 | |
| 4,295,538 A * | 10/1981 | Lewus | B60G 13/14 | |
| | | | 180/165 | |
| 4,374,632 A * | 2/1983 | Wilcox | F01C 21/0863 | |
| | | | 418/267 | |
| 4,376,620 A * | 3/1983 | Colston | F01C 21/0809 | |
| | | | 418/102 | |
| 5,083,909 A * | 1/1992 | Kunsemiller | F04C 2/3446 | |
| | | | 403/359.4 | |
| 5,702,243 A * | 12/1997 | Gerlach | F04C 15/0023 | |
| | | | 418/132 | |
| 8,839,920 B2 * | 9/2014 | Anderson | B60G 13/14 | |
| | | | 180/165 | |
| 2007/0089924 A1* | 4/2007 | de la Torre | B60G 13/14 | |
| | | | 180/305 | |
| 2009/0260935 A1* | 10/2009 | Avadhany | B60G 13/14 | |
| | | | 188/297 | |

\* cited by examiner

HYDRAULIC ENERGY CONVERSION DEVICE

CROSS-REFERENCE TO RELATED APPLICATION

This non-provisional application claims priority under 35 U.S.C. §119(a) on Patent Application No(s). 102141970 filed in Taiwan, R.O.C. on Nov. 19, 2013, the entire contents of which are hereby incorporated by reference.

FIELD OF THE INVENTION

The present invention relates to an energy conversion technique, and more particularly to a hydraulic energy conversion device for use with a shock absorber or a damping device to recycle the hydraulic energy thereof.

BACKGROUND OF THE INVENTION

Being affected by many severe events involving oil crisis and air pollution in recent years, it has become an inevitable trend for all kinds of traffic and transportation means to use energy-saving and environment-friendly parts. For internal combustion engine vehicles, only a small part of the power output by the internal combustion engine thereof is use to run the vehicles while other part is offset by various kinds of resistance. One example of such resistance comes from the rough road surfaces. In the past, a shock absorbing damper is used to absorb vibration and convert the vibration energy into heat energy, which is then dissipated into ambient air. Now, many related technical fields have developed the idea of recycling various kinetic energy and heat energy, such as the brake energy, damping energy and so on, by converting them into electric energy. To recycle the damping energy, a hydraulic motor is used to convert the hydraulic energy of the damping device or shock absorber into mechanical energy, which can be then used as a power source to operate a generator, to charge a battery or for other purposes, so that the load of the vehicle engine for rotating the main generator can be reduced.

The hydraulic motor for converting the hydraulic energy into mechanical energy is an element widely used in many hydraulic systems. There are many differently designed hydraulic motors, such as plunger, screw-rod, gear and vane type hydraulic motors, which have different features and are suitable for different occasions. Except the vane type hydraulic motor, the screw-rod and the gear type hydraulic motor must have an input and an output rotary shaft arranged in pairs. Therefore, the output shaft is not concentric with the case of the hydraulic motor. The plunger type hydraulic motor includes a plurality of circumferentially arranged plunger pumps and therefore has a considerably large diameter. The shock absorbers for motor vehicles are usually a long tube in configuration with a relatively small inner diameter. Therefore, to substitute a hydraulic motor for the damping valve in the vehicle shock absorber to recycle the vibration energy, it would be better to use the vane-type hydraulic motor, which is more suitable for the limited internal space of the conventional vehicle shock absorber and has a shaft coaxial with the shock absorber for connecting to a generator to output the converted mechanical energy. However, the typical vane-type hydraulic motor is enclosed in a complicated cast case with the shaft exposed from the case, and has radially oriented hydraulic fluid inlets and outlets and a fixing plate provided on one side thereof. Further, the output shaft and the rotor must be provided as two separated parts to enable assembling of the vane-type hydraulic motor. The fully assembled vane-type hydraulic motor still has an overall length and an outer diameter much larger than those of the damping valve to be replaced and therefore could not be fitted into but only be hooked to an outer side of the tubular body of the shock absorber. That is, the use of the conventional vane-type hydraulic motor to replace the damping valve would occupy an additional space in the vehicle and could not be directly used to replace the conventional tube-shaped shock absorber.

SUMMARY OF THE INVENTION

A primary object of the present invention is to provide a hydraulic energy conversion device for mounting in a hydraulic shock absorber to convert the hydraulic energy of the hydraulic shock absorber into mechanical energy without hindering the hydraulic shock absorber from normal operation.

To achieve the above and other objects, the hydraulic energy conversion device according to a preferred embodiment of the present invention is used with a hydraulic shock absorber and includes a main body being an annular member having a central hole, an output shaft mounted in the central hole of the main body with a centerline extended perpendicular to the central hole; a fixing plate located at an end of the main body and provided with a plurality of passage holes; an outer cover located at another end of the main body opposite to the fixing plate and having a central opening for the output shaft to outwardly extended through the outer cover; and a plurality of vanes circumferentially spaced on the output shaft to locate in a space defined between the main body, the fixing plate and the outer cover. When the hydraulic shock absorber is compressed or extended, the hydraulic fluid in the hydraulic shock absorber flows through the passage holes into the space defined between the main body, the fixing plate and the outer cover to push against the vanes and accordingly, drives the output shaft to rotate.

The hydraulic energy conversion device of the present invention can be mounted inside the hydraulic shock absorber without occupying any space in a car, and can be directly used to replace conventional shock absorbers of the same size. The hydraulic energy conversion device of the present invention converts the vibration energy of the hydraulic fluid in the shock absorber into a rotary mechanical energy. Depending on actual need in use, a user may use the rotary mechanical energy to drive a generator to output electric power, which can be used to charge the battery or for other purposes. While the shock absorber using the hydraulic energy conversion device of the present invention is very suitable for electric vehicles, it can also be mounted on general internal combustion engine vehicles to achieve the same effect of recycling the vibration energy.

The above summary of invention and the following detailed description of the preferred embodiment as well as the accompanying drawings are provided to further explain the technical means adopted by the present invention to achieve the predetermined objects and effects. Other objects and advantages of the present invention will be recited below.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings. One of ordinary skill in the art can easily understand the advantages and effects of the present invention from the description below.

Figure 1:
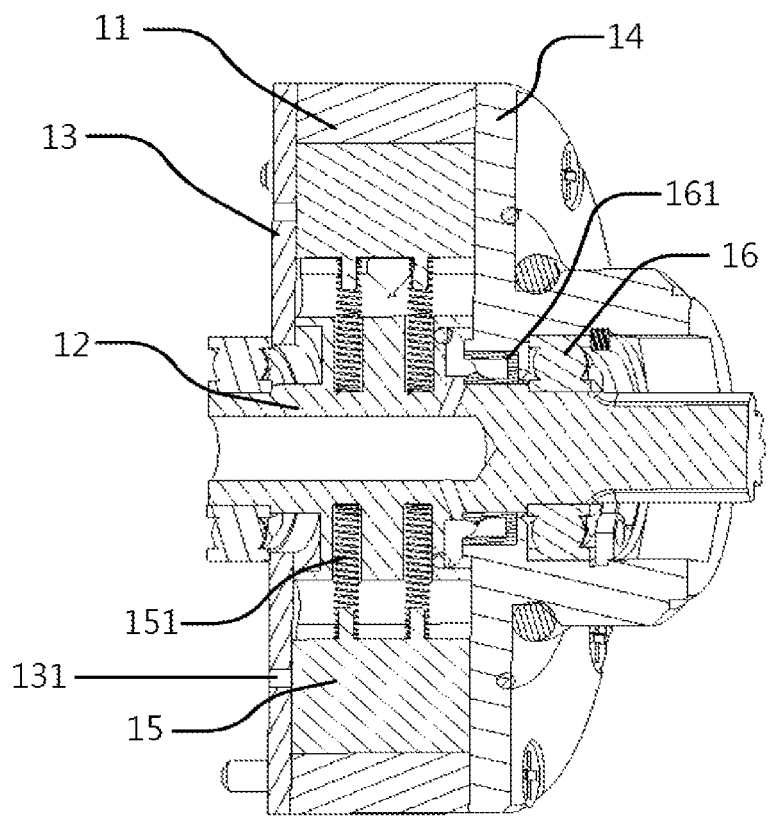
FIG. 1 is a longitudinal sectional view of a hydraulic energy conversion device according to a preferred embodiment of the present invention.

Please refer to FIG. 1 that is a longitudinal sectional view showing the structure of a hydraulic energy conversion device according to a preferred embodiment of the present invention. As shown, the hydraulic energy conversion device includes a main body 11, which is an annular member having a central hole; an output shaft 12, which is mounted in the central hole of the main body 11 with a centerline extended perpendicular to the central hole; a fixing plate 13, which is located at an end of the main body 11 and provided with a plurality of passage holes 131; an outer cover 14, which is located at another end of the main body 11 opposite to the fixing plate 13 and has a central opening, via which the output shaft 12 is outwardly extended through the outer cover 14; and a plurality of vanes 15, which are circumferentially spaced on the output shaft 12 to locate in a space defined between the main body 11, the fixing plate 13 and the outer cover 14. The vanes 15 are connected to the output shaft 12 via an elastic element unit 151. A bearing 16 is provided between the outer cover 14 and the output shaft 12 with a radial shaft seal 161 mounted to one side of the bearing 16. The output shaft 12 is connected to a generator (not shown in FIG. 1).

Figure 2:
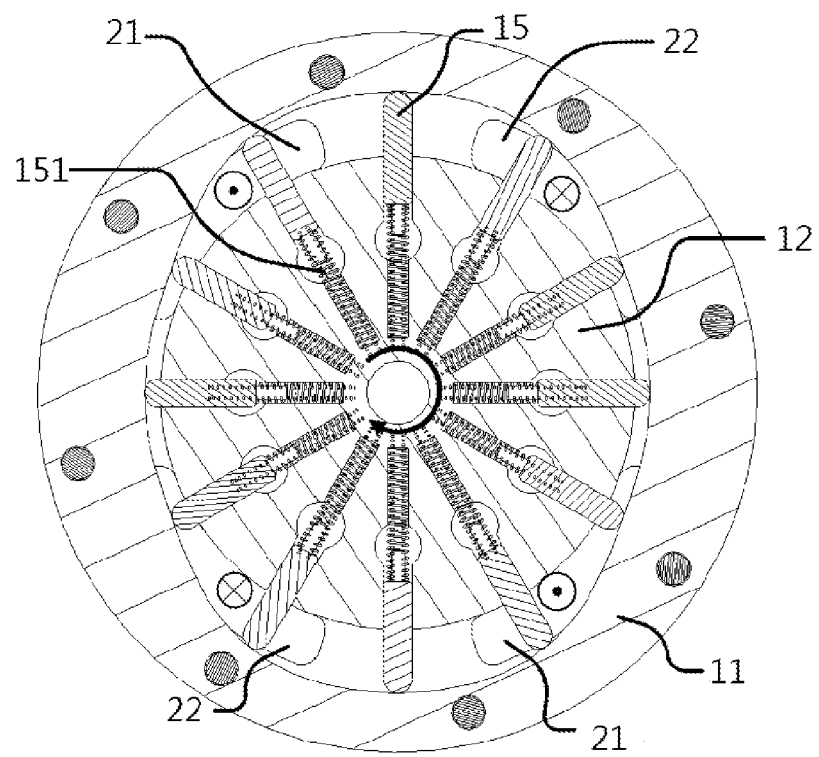
FIG. 2 is a cross sectional view of the hydraulic energy conversion device according to the preferred embodiment of the present invention.

FIG. 2 is a cross sectional view of the hydraulic energy conversion device according to the preferred embodiment of the present invention. As shown, when viewing in front of the drawing, the hydraulic energy conversion device is provided on an upper left and a lower right position with two fluid inlets 21, and on an upper right and a lower left position with two fluid outlets 22. When the hydraulic energy conversion device is mounted in a shock absorber (not shown in FIG. 2), the hydraulic fluid in the shock absorber flows into the hydraulic energy conversion device via the two fluid inlets 21 to apply pressure on the vanes 15 and accordingly, forms a rotational torque on the output shaft 12 and drives the latter to rotate clockwise. Then, the hydraulic fluid flows back into the shock absorber via the fluid outlets 22.

The vanes 15 are connected to the output shaft 12 via the elastic element unit 151, which normally radially outward pushes the vanes 15 against the main body 11, so as to ensure that the hydraulic fluid smoothly flows through a hydraulic fluid path provided in the hydraulic energy conversion device without the risk of leaking to cause poor rotational movement of the vanes 15 and the output shaft 12.

Figure 3:
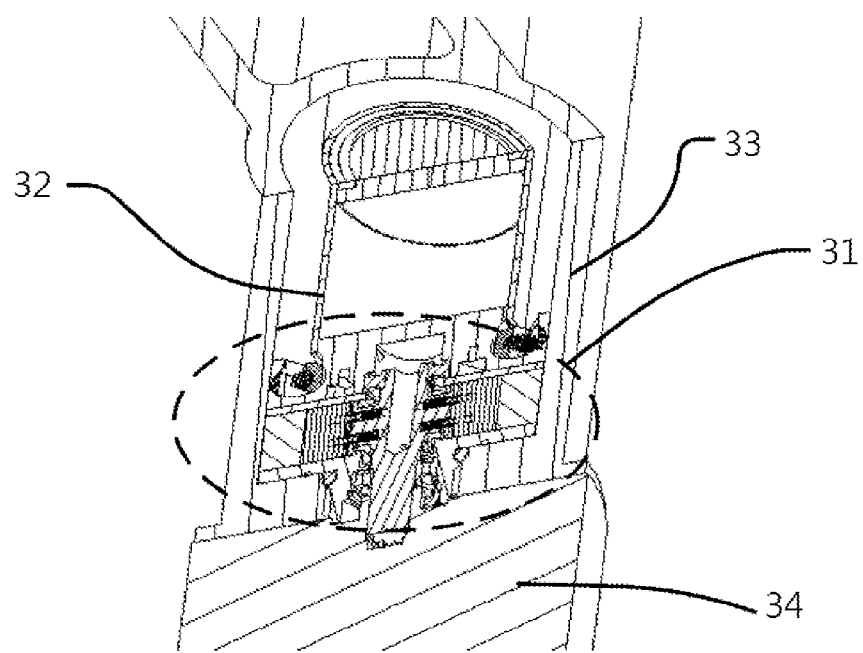
FIG. 3 is a cutaway view showing the application of the hydraulic energy conversion device of the present invention to a power-generating shock absorber.

FIG. 3 is a cutaway view showing the application of a hydraulic energy conversion device 31 of the present invention to a power-generating shock absorber having an inner tube 32 and an outer tube 33. As shown, the hydraulic energy conversion device 31 is mounted on an inner tube 32 near an end thereof, and has an outer diameter not exceeded an inner diameter of the outer tube 33 of the shock absorber. The output shaft of the hydraulic energy conversion device 31 is connected to a generator 34 for generating and outputting electric energy.

The hydraulic energy conversion device of the present invention is of a mono-shaft structure, the main body 11 thereof does not have any hydraulic fluid path extended therethrough and can therefore have an outer diameter as small as possible. The fixing plate 13 is provided with the passage holes 131, via which the hydraulic fluid flows into the hydraulic energy conversion device to push against the vanes 15 and accordingly rotate the output shaft 12. By having an axially extended hydraulic fluid path provided therein, the hydraulic energy conversion device of the present invention is suitable for coaxially mounting in the shock absorber. The hydraulic fluid inlets and outlets 21, 22 are of large-size holes for the fluid path to have reduced resistance to the hydraulic fluid while maintaining a size the same as the outer diameter of the main body 11. The output shaft 12 includes integrally formed hub and rotary shaft to save the radial space that is otherwise needed by a shaft having an outer and an inner member to be associated with each other, and can therefore have an outer diameter small enough for mounting in the central hole of the main body 11. With this design, the hydraulic energy conversion device of the present invention can have an outer diameter small enough for mounting in the inner tube 32 of the shock absorber and a largely shortened length to avoid affecting the stroke of the shock absorber. While the shock absorber using the hydraulic energy conversion device is very suitable for electric vehicles, it can also be mounted on general internal combustion engine vehicles to achieve the same effect of recycling the vibration energy.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A hydraulic energy conversion device for use with a hydraulic shock absorber, the hydraulic energy conversion device being mounted in the hydraulic shock absorber, comprising:
    a main body being an annular member having a central hole;
    an output shaft being mounted in the central hole of the main body with a centerline extended perpendicular to the central hole;
    a fixing plate being located at an end of the main body and provided with a plurality of passage holes;
    an outer cover being located at another end of the main body opposite to the fixing plate and having a central opening, via which the output shaft is outwardly extended through the outer cover; and
    a plurality of vanes being circumferentially spaced on the output shaft to locate in a space defined between the main body, the fixing plate and the outer cover;
    wherein, when the hydraulic shock absorber is compressed or extended, a hydraulic fluid of the hydraulic shock absorber flows through the plurality of passage holes into the space defined between the main body, the fixing plate and the outer cover to push against the plurality of vanes, which drives the output shaft to rotate;

wherein an external diameter of the hydraulic energy conversion device is smaller than an internal diameter of an outer tube of the hydraulic shock absorber.

2. The hydraulic energy conversion device as claimed in claim 1, wherein the output shaft is connected to a generator.

3. The hydraulic energy conversion device as claimed in claim 1, further comprising a bearing provided between the outer cover and the output shaft.

4. The hydraulic energy conversion device as claimed in claim 3, further comprising a radial shaft seal mounted to one side of the bearing.

5. The hydraulic energy conversion device as claimed in claim 1, wherein the vanes are connected to the output shaft via an elastic element unit.

\* \* \* \* \*